US011916295B2

(12) United States Patent
Toriumi et al.

(10) Patent No.: US 11,916,295 B2
(45) Date of Patent: Feb. 27, 2024

(54) FREQUENCY SELECTIVE SURFACE

(71) Applicant: Nippon Telegraph and Telephone Corporation, Tokyo (JP)

(72) Inventors: Yohei Toriumi, Tokyo (JP); Go Itami, Tokyo (JP); Jun Kato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 416 days.

(21) Appl. No.: 17/283,432

(22) PCT Filed: Sep. 26, 2019

(86) PCT No.: PCT/JP2019/037954
§ 371 (c)(1),
(2) Date: Apr. 7, 2021

(87) PCT Pub. No.: WO2020/075521
PCT Pub. Date: Apr. 16, 2020

(65) Prior Publication Data

US 2021/0351515 A1 Nov. 11, 2021

(30) Foreign Application Priority Data

Oct. 10, 2018 (JP) ................................ 2018-191608

(51) Int. Cl.
*H01Q 15/00* (2006.01)
*H01Q 1/38* (2006.01)

(52) U.S. Cl.
CPC ........... *H01Q 15/0013* (2013.01); *H01Q 1/38* (2013.01)

(58) Field of Classification Search
CPC ............... H01Q 15/00; H01Q 15/0006; H01Q 15/0013; H01Q 1/38
See application file for complete search history.

(56) References Cited

U.S. PATENT DOCUMENTS

2003/0071763 A1* 4/2003 McKinzie, III .... H01Q 15/0013 343/754
2003/0142036 A1* 7/2003 Wilhelm .................. H01Q 1/38 343/756
2007/0159396 A1 7/2007 Sievenpiper et al.

FOREIGN PATENT DOCUMENTS

CN 107834194 A * 3/2018 ............ H01Q 15/00
JP 2005-210016 8/2005
JP 2005-252567 9/2005

OTHER PUBLICATIONS

Itami et al., "A Novel Design Method for Miniaturizing FSS Based on Theory of Meta-materials," International Symposium on Antennas and Propagation (ISAP2017), 2017, 2 pages.

(Continued)

*Primary Examiner* — Hoang V Nguyen
(74) *Attorney, Agent, or Firm* — Fish & Richardson P.C.

(57) ABSTRACT

A frequency selective surface having a steep attenuation slope (high sharpness) characteristic is provided without decreasing the line width of a conductive pattern nor the pattern interval thereof. In a frequency selective surface having a structure in which resonators k1xy having identical shapes are periodically arrayed on a dielectric substrate 101, each resonator k1xy includes a cross-shaped conductive pattern formed on the dielectric substrate 101 and a lateral pattern 10 and a longitudinal pattern 20 forming a cross are shaped such that each pattern is extended by a predetermined length in respective directions, each pattern extended by the predetermined length is further extended in both directions orthogonal to each other on the dielectric substrate 101, and leading end parts of the respective further extensions face each other at a predetermined interval d.

4 Claims, 7 Drawing Sheets

(56) References Cited

OTHER PUBLICATIONS

Majumdar et al., "Parametric Analysis and Modeling of Jerusalem cross Frequency Selective Surface," International Journal of Electromagnetics and Applications, Jun. 2016, 6(1):13-21.

* cited by examiner

FREQUENCY SELECTIVE SURFACE

CROSS-REFERENCE TO RELATED APPLICATIONS

This application is a National Stage application under 35 U.S.C. § 371 of International Application No. PCT/JP2019/037954, having an International Filing Date of Sep. 26, 2019, which claims priority to Japanese Application Serial No. 2018-191608, filed on Oct. 10, 2018. The disclosure of the prior application is considered part of the disclosure of this application, and is incorporated in its entirety into this application.

TECHNICAL FIELD

The present invention relates to a frequency selective surface having a structure in which resonators having identical shapes are periodically arrayed on a dielectric substrate.

BACKGROUND ART

In a frequency selective surface (FSS), resonators each formed of a conductor pattern having dimensions equivalent to or smaller than wavelength are periodically arrayed so that the transmission and reflection characteristics of an incident electromagnetic wave have frequency dependency. The operation principle thereof can be explained based on a resonance phenomenon of an equivalent circuit expressed with inductance and capacitance included in each resonator.

For example, a frequency selective surface having a Jerusalem cross shape, which is a typical conductor pattern shape, has a band stop characteristic having a peak at a resonance frequency expressed by a formula below. The Jerusalem cross shape is formed of a conductive pattern shaped in a cross and a conductive pattern in which both end parts of each of longitudinal and lateral conductive patterns of the cross are extended by a predetermined length in both horizontal directions orthogonal to each other.

[Formula 1]

$$f = \frac{1}{2\pi\sqrt{LC}} \qquad (1)$$

A method of setting the resonance frequency is disclosed in, for example, Non-Patent Literature 1.

CITATION LIST

Non-Patent Literature

Non-Patent Literature 1: G. Itami et al., "A Novel Design Method for Miniaturizing FSS Based on Theory of Metamaterials", International Symposium on Antennas and Propagation (ISAP2017), 1033, Phuket, Thailand, November 2017.

SUMMARY OF THE INVENTION

Technical Problem

However, a conventional frequency selective surface needs to have a resonator size equivalent to or smaller than wavelength to prevent unexpected resonance and cannot ensure inductance and capacitance in magnitudes necessary for achieving a desired frequency characteristic.

In a case of a Jerusalem cross shape, to increase the gradient of the attenuation slope of a frequency selective surface near a cutoff frequency, capacitance is decreased and inductance is increased while the condition of Formula (1) is maintained. In a case of a ring slot shape, capacitance is increased by reducing the gap between rings.

To increase inductance and capacitance in this manner, the line width of a conductive pattern and the pattern interval thereof need to be decreased. However, desired inductance and capacitance cannot be obtained in some cases due to fabrication constraint such as fabrication accuracy.

Thus, the conventional frequency selective surface is applicable only to usage in which a frequency to be reflected and a frequency to be transmitted are sufficiently separate from each other or the gradient of the attenuation slope is not steep. In other words, the sharpness of frequency selection is poor (the Q value is low).

The present invention has been made in view of solving the above-described problem and is intended to provide a frequency selective surface having a steep attenuation slope characteristic without decreasing the line width of a conductive pattern nor the pattern interval thereof.

Means for Solving the Problem

A frequency selective surface according to an aspect of the present invention is a frequency selective surface having a structure in which resonators having identical shapes are periodically arrayed on a dielectric substrate, and the resonator has an equivalent circuit in which two or more LC serial resonance circuits are connected in parallel with each other.

Effects of the Invention

According to the present invention, a frequency selective surface having a steep attenuation slope (high sharpness) characteristic can be provided without decreasing the line width of a conductive pattern nor the pattern interval thereof.

DESCRIPTION OF EMBODIMENTS

Embodiments of the present invention will be described below with reference to the accompanying drawings. Components identical to each other in a plurality of drawings are denoted by the same reference sign, and duplicate description thereof is omitted. Before description of the embodiments of the present invention, the principle of the present invention will be described below.

(Principle of the Present Invention)

A conventional frequency selective surface has a frequency characteristic determined by a single LC resonance. Thus, the inductance or capacitance thereof needs to be increased to obtain a reduced bandwidth. However, since the magnitudes of the inductance and the capacitance that can be obtained are limited as described above, a desired frequency characteristic cannot be achieved in some cases.

The present invention achieves a frequency selective surface including a plurality of LC resonances to have a steep attenuation slope (high sharpness) characteristic while the inductance and the capacitance are maintained substantially the same.

Figure 1:
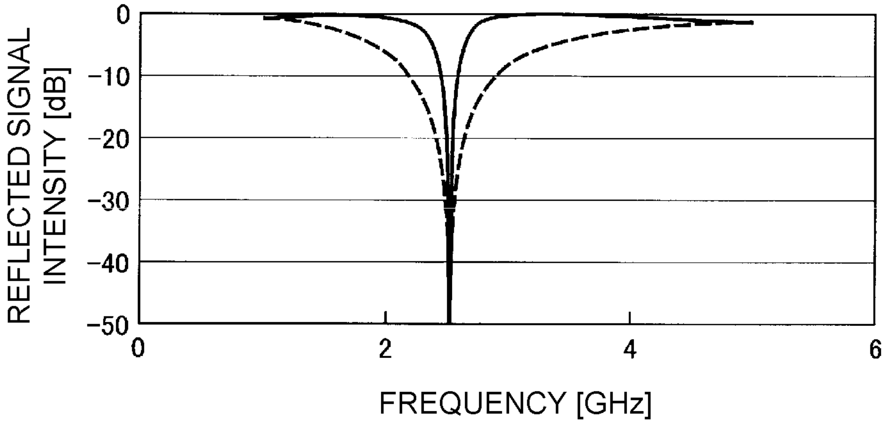
FIG. 1 is a diagram illustrating two reflection characteristics.

FIG. 1 is a diagram illustrating the reflection characteristic of a single LC parallel resonance circuit and the reflection characteristic of a resonance circuit in which two LC serial resonance circuits are connected in parallel with each other. In FIG. 1, the horizontal axis represents frequency [GHz], and the vertical axis represents reflected signal intensity [dB]. In FIG. 1, the dashed line illustrates the characteristic of the single LC parallel resonance circuit, and the solid line illustrates the characteristic of the resonance circuit in which two LC serial resonance circuits are connected in parallel with each other.

As illustrated in FIG. 1, the characteristic (solid line) of the case in which two LC serial resonance circuits are connected in parallel with each other has a passband width of 0.4 GHz, which is smaller than that of the single LC parallel resonance circuit (2.1 GHz). The characteristic of the case in which two LC serial resonance circuits are connected in parallel with each other is such a high-sharpness characteristic that the reflected signal intensity is 0 dB at frequencies of ±0.6 GHz with respect to the peak frequency of 2.5 GHz, in other words, the reflected signal intensity is 1. However, the characteristic of the dashed line is such a low-sharpness characteristic that the reflected signal intensity is equal to or lower than −3 dB at frequencies of ±0.6 GHz with respect to the peak frequency of 2.5 GHz and more than half of a signal is reflected.

The reason is obvious through calculation of the circuit frequency characteristic. It can be qualitatively interpreted that the gradient of the attenuation slope can be increased by sandwiching a passband between two cutoff frequencies.

In this manner, a steep gradient of the attenuation slope can be achieved by a frequency selective surface that can be expressed as an equivalent circuit in which two LC serial resonance circuits are connected in parallel with each other. The equivalent circuit may be expressed as three LC serial resonance circuits connected in parallel.

The present invention proposes, based on the above-described principle, a method of configuring a frequency selective surface having an equivalent circuit in which a plurality of LC serial resonance circuits are connected in parallel with each other.

First Embodiment

Figure 2:
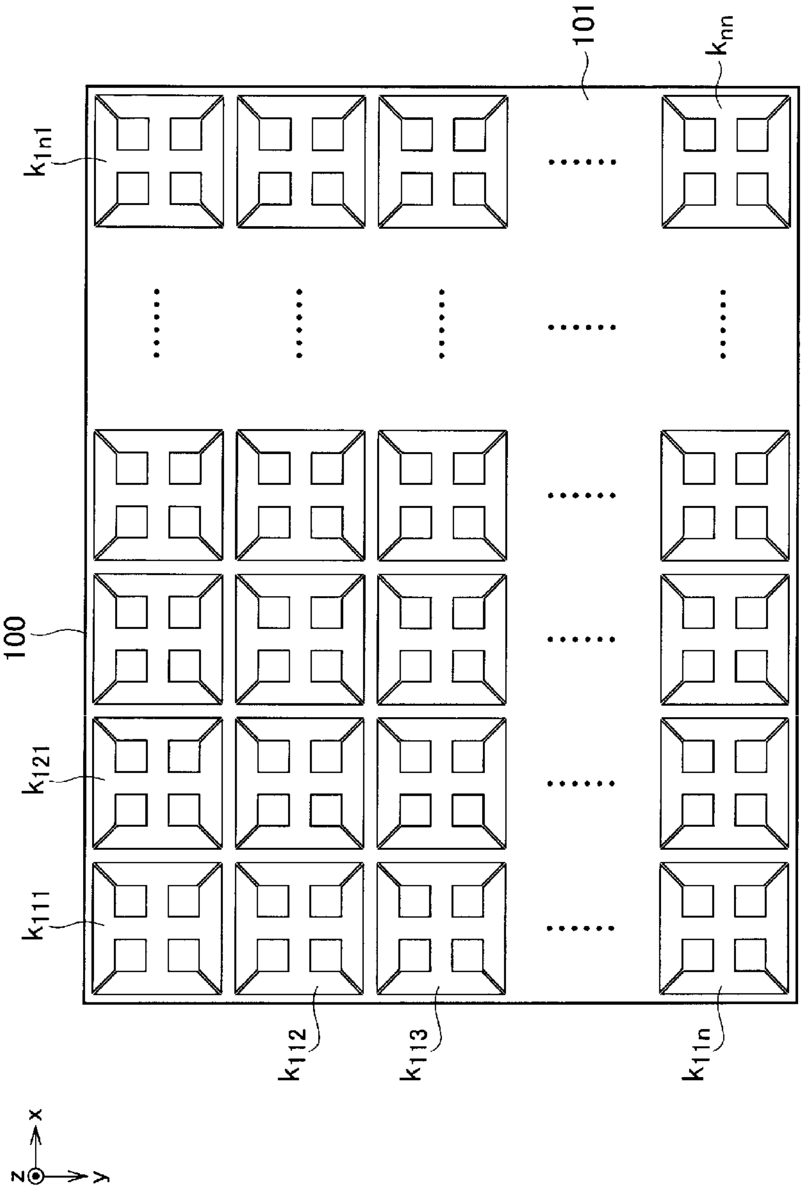
FIG. 2 is a diagram schematically illustrating a plan view of a frequency selective surface according to a first embodiment of the present invention.

FIG. 2 is a diagram schematically illustrating a plan view of a frequency selective surface according to a first embodiment of the present invention. This frequency selective surface 100 illustrated in FIG. 2 has a configuration in which resonators $k_{1xy}$ each including a conductive pattern having a shape similar to the shape of the Chinese character "田" are arrayed on a dielectric substrate 101. An x direction and a y direction are defined to be the lateral direction and the longitudinal direction, respectively, in FIG. 2.

The dielectric substrate 101 is, for example, a glass epoxy substrate or a polyimide film substrate. The material of the dielectric substrate 101 may be any dielectric material.

For example, 10 resonators $k_{1xy}$ are arranged in each of the x direction and the y direction to form a frequency selective surface 100. The size of each resonator $k_{1xy}$ is approximately ⅓ of the wavelength at a resonance frequency.

A signal is input to the frequency selective surface 100 in the −z direction (back side) and output (transmitted) in the z direction (front side). When an electromagnetic wave is input to the frequency selective surface 100, an electric field occurs at the xy plane in which the resonators $k_{1xy}$ are arrayed, and a current due to a resonance phenomenon flows.

Figure 3:
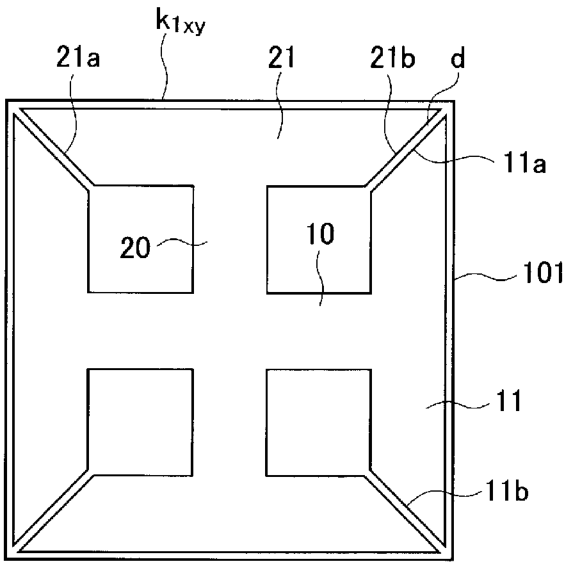
FIG. 3 is a diagram schematically illustrating a plan view of a resonator included in the frequency selective surface illustrated in FIG. 2.

FIG. 3 is a plan view illustrating one resonator $k_{1xy}$ in an enlarged manner. The resonator $k_{1xy}$ illustrated in FIG. 3 includes a cross-shaped conductive pattern formed on the dielectric substrate 101 and a lateral pattern 10 and a longitudinal pattern 20 forming a cross are shaped such that each pattern is extended by a predetermined length in respective directions, each pattern extended by the predetermined length is further extended in both directions orthogonal to each other on the dielectric substrate, and leading end parts 11*a*, 11*b*, 21*a*, 21*b*, . . . (the other four places are omitted) of the respective further extensions face each other at a predetermined interval d.

Specifically, the lateral pattern 10 is extended by the predetermined length in the x direction from a central part orthogonal to the longitudinal pattern 20 and then extended along its end side in both directions (±y directions). Then, each extension forms leading end parts 11*a* and 11*b* along the diagonal lines of a rectangle housing the lateral pattern 10 and the longitudinal pattern 20. In the −x direction, the lateral pattern 10 has the same configuration as the above-described configuration in the x direction.

The longitudinal pattern 20 is extended by the predetermined length in the y direction from a central part orthogonal to the lateral pattern 10 and then extended along its end side in both directions (±x directions). Then, each extension forms leading end parts 21*a* and 21*b* along the diagonal lines of the rectangle housing the longitudinal pattern 20 and the lateral pattern 10. In the −y direction, the longitudinal pattern 20 has the same configuration as the above-described configuration in the y direction.

The leading end part 11*a* of the lateral pattern 10 faces the leading end part 21*b* of the longitudinal pattern 20 at the interval d on an above-described diagonal line. The leading end parts 11$a$ and 21$b$ of both members form a capacitor. The size of the interval d is preferably equal to or smaller than approximately 1/10 of the size of the resonator $k_{1xy}$. The interval d may have any size with which capacitors can be formed at leading end parts of the lateral pattern 10 and the longitudinal pattern 20.

Specifically, in the resonator $k_{1xy}$, the lateral pattern 10 and the longitudinal pattern 20 are connected with each other through four capacitors to form resonance paths through which two resonance currents flow.

Figure 4:
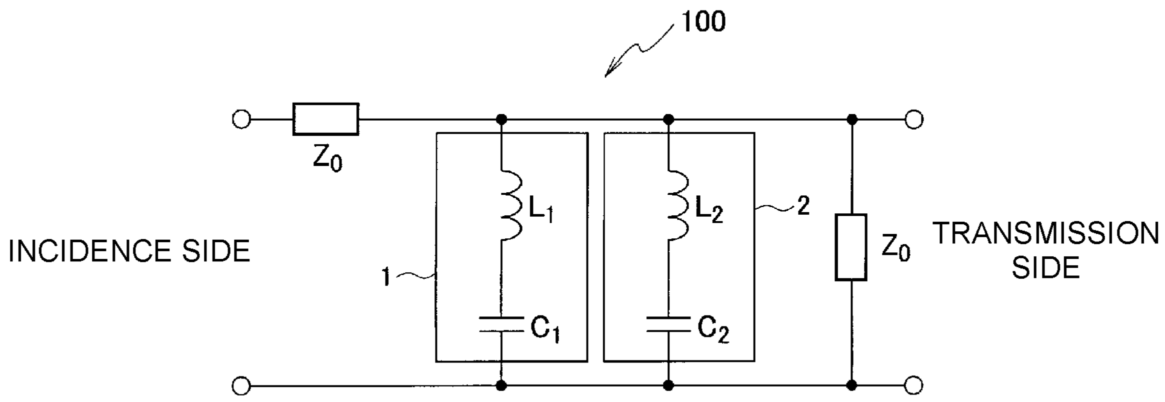
FIG. 4 is a diagram illustrating an equivalent circuit of the frequency selective surface illustrated in FIG. 2.

FIG. 4 is a diagram illustrating an equivalent circuit of the frequency selective surface 100 including the resonator $k_{1xy}$ illustrated in FIG. 3. As illustrated in FIG. 4, the resonator $k_{in}$, included in the frequency selective surface 100 according to the present embodiment has an equivalent circuit in which an LC serial resonance circuit 1 and an LC serial resonance circuit 2 are connected in parallel with each other. Each reference sign $Z_0$ in FIG. 4 indicates space impedance. The space impedance $Z_0$ is determined by vacuum permittivity and permeability.

Figure 5:
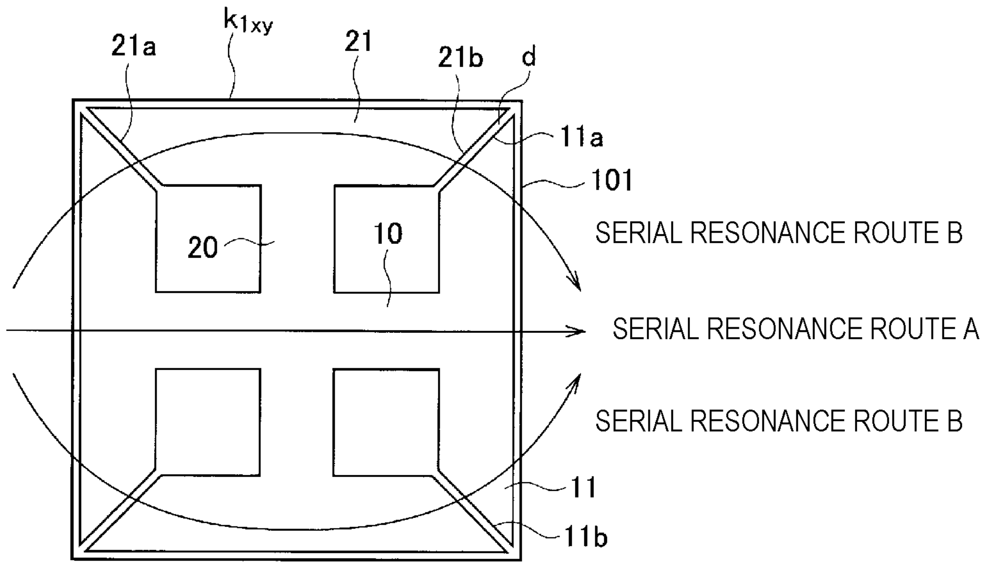
FIG. 5 is a diagram schematically illustrating two resonance routes of the resonator illustrated in FIG. 3.

FIG. 5 is a diagram schematically illustrating resonance paths through which two resonance currents flowing through the resonator $k_{1xy}$ flow. As illustrated in FIG. 5, two resonance paths of Route A and Route B are formed.

Comparative Example

Figure 6:
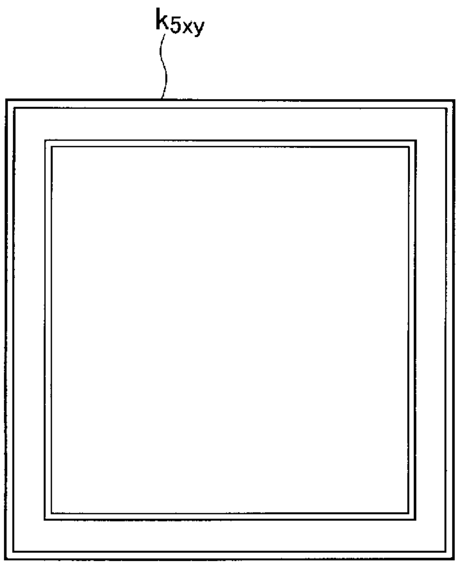
FIG. 6 is a diagram schematically illustrating a plan view of a resonator having a ring slot structure.

FIG. 6 is a diagram schematically illustrating a plan view of a resonator $k_{5xy}$ included in a frequency selective surface 500 of a comparative example. The resonator $k_{5xy}$ illustrated in FIG. 6 corresponds to the resonator $k_{1xy}$ illustrated in FIG. 3. The resonators $k_{5xy}$ are arrayed on the xy plane to form the frequency selective surface 500 (not illustrated) of a ring slot type. The equivalent circuit of the frequency selective surface 500 of the ring slot type can be expressed as one LC parallel resonance circuit (not illustrated).

Figure 7:
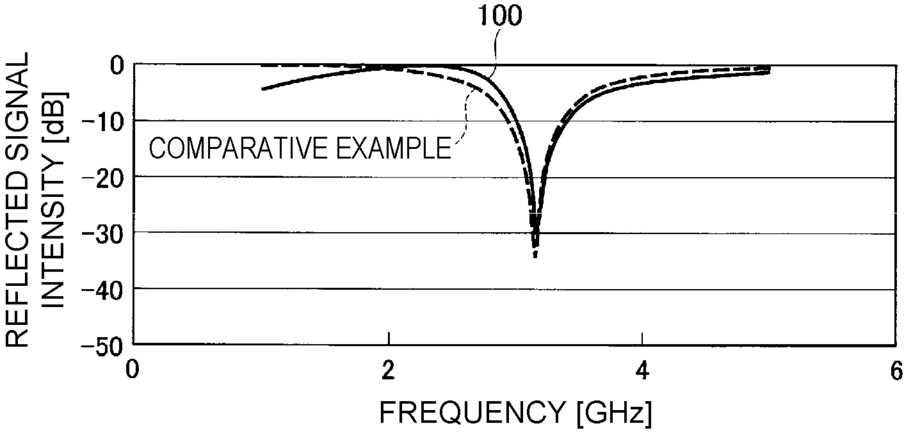
FIG. 7 is a diagram illustrating the reflection characteristics of the frequency selective surface illustrated in FIG. 2 and a frequency selective surface including the resonator illustrated in FIG. 6.

FIG. 7 is a diagram illustrating the reflection characteristics of the frequency selective surface 100 and the frequency selective surface 500. In FIG. 7, the solid line illustrates the reflection characteristic of the frequency selective surface 100, and the dashed line illustrates the reflection characteristic of the frequency selective surface 500. The relation between the horizontal axis and the vertical axis is the same as that in FIG. 1.

An example in which the frequency selective surface 500 is formed to have an extremely small gap between rings is described. The interval of the gap is, for example, 0.2 mm.

The interval d of the frequency selective surface 100 according to the present embodiment is, for example, 0.5 mm. The line width of the conductive pattern is equal to or larger than 0.5 mm.

As illustrated in FIG. 7, the frequency selective surface 100 according to the present embodiment has a peak frequency of 3.2 GHz and a bandwidth of 1.2 GHz, and those of the comparative example (the frequency selective surface 500) are 3.2 Hz and 1.2 GHz.

In this manner, even when the interval d is large, the frequency selective surface 100 according to the present embodiment can have a bandwidth equivalent to that of the frequency selective surface 500 having a small interval between rings.

As described above, the frequency selective surface 100 according to the present embodiment is a frequency selective surface having a structure in which the resonators $k_{1xy}$ having identical shapes are periodically arrayed on the dielectric substrate 101, and each resonator $k_{1xy}$ has an equivalent circuit in which two or more LC serial resonance circuits are connected in parallel with each other. The resonator $k_{1xy}$ includes a cross-shaped conductive pattern formed on the dielectric substrate 101 and the lateral pattern 10 and the longitudinal pattern 20 forming a cross are shaped such that each pattern is extended by a predetermined length in respective directions, each pattern extended by the predetermined length is further extended in both directions orthogonal to each other on the dielectric substrate 101, and leading end parts of the respective further extensions face each other at the predetermined interval d.

Accordingly, a frequency selective surface having a steep attenuation slope (high sharpness) characteristic can be provided without decreasing the line width of a conductive pattern nor the pattern interval thereof.

Second Embodiment

Figure 8:
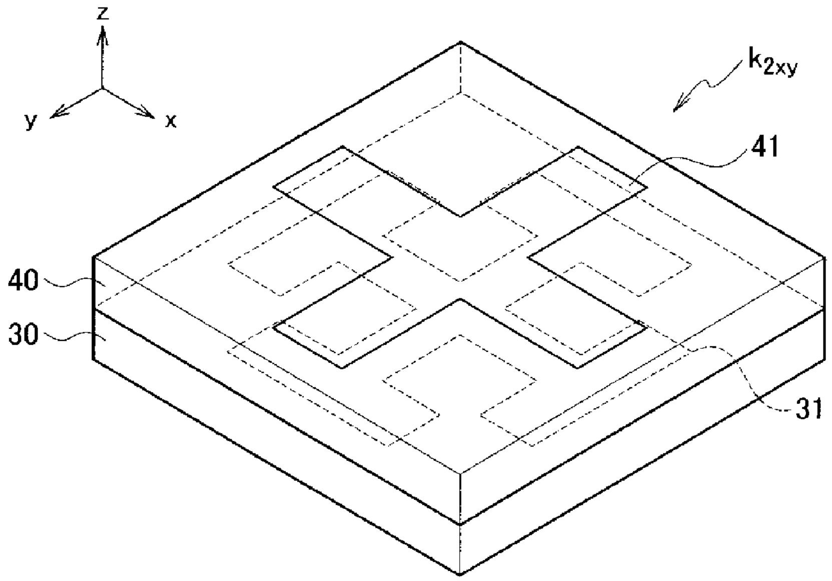
FIG. 8 is a perspective view schematically illustrating a resonator included in a frequency selective surface according to a second embodiment of the present invention.

FIG. 8 is a perspective view schematically illustrating the appearance of a resonator $k_{2xy}$ included in a frequency selective surface 200 (not illustrated) according to a second embodiment of the present invention.

The resonator $k_{2xy}$ includes a cross-shaped conductive pattern 31 formed on the front surface of a first dielectric substrate 30, and a conductive pattern 41 having a cross shape, formed on the front surface of a second dielectric substrate 40, and having a shape different from the shape of the conductive pattern 31, and the first dielectric substrate 30 and the second dielectric substrate 40 are placed over each other.

The conductive pattern 31 has, for example, a Jerusalem cross shape, and the conductive pattern has, for example, a cross shape. The first dielectric substrate 30 and the second dielectric substrate 40 are in close contact with each other, and the thicknesses of the substrates are not limited as long as the conductive pattern 31 and the conductive pattern 41 are disposed at positions where they are connected with each other through a capacitor. The shapes of the conductive patterns 31 and 41 are not limited as well.

Figure 9:
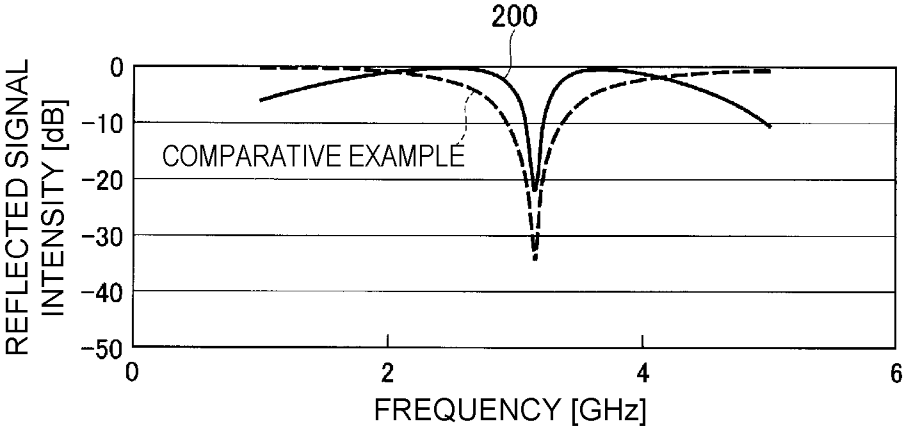
FIG. 9 is a diagram illustrating the reflection characteristics of the frequency selective surface illustrated in FIG. 8 and the frequency selective surface including the resonator illustrated in FIG. 6.

FIG. 9 is a diagram illustrating the reflection characteristics of the frequency selective surface 200 and the frequency selective surface 500. In FIG. 9, the solid line illustrates the reflection characteristic of the frequency selective surface 200, and the dashed line illustrates the reflection characteristic of the frequency selective surface 500. The relation between the horizontal axis and the vertical axis is the same as that in FIG. 7.

As illustrated in FIG. 9, the frequency selective surface 200 according to the present embodiment has a peak frequency of 3.2 GHz and a bandwidth of 0.5 GHz, and those of the comparative example (the frequency selective surface 500) are 3.2 Hz and 1.2 GHz. The reflected signal intensity of the frequency selective surface 200 at the peak frequency is approximately −22 dB, which is not sufficiently small, and this is because optimization is not performed. The reflected signal intensity can be made equivalent to that of the frequency selective surface 500 through optimization.

In this manner, a steep attenuation slope characteristic can be also achieved by a frequency selective surface in which dielectric substrates are placed over each other to have two or more LC serial resonance circuits in the z direction. Although FIG. 8 illustrates the example in which conductive patterns having a Jerusalem cross shape and a cross shape are placed over each other, the present invention is not limited to having these shapes of conductive patterns.

For example, the resonator $k_{2xy}$ may include conductive patterns having a cross shape and a ring shape (not illustrated) placed over each other. Specifically, the resonator $k_{2xy}$ includes a first conductive pattern 31 formed on the first dielectric substrate 30, and a second conductive pattern 41 formed on the second dielectric substrate 40 and having a shape different from the shape of the first conductive pattern 31, and the first dielectric substrate 30 and the second dielectric substrate 40 are placed over each other. Accordingly, a frequency selective surface having a steep attenuation slope characteristic can be achieved.

Third Embodiment

Figure 10:
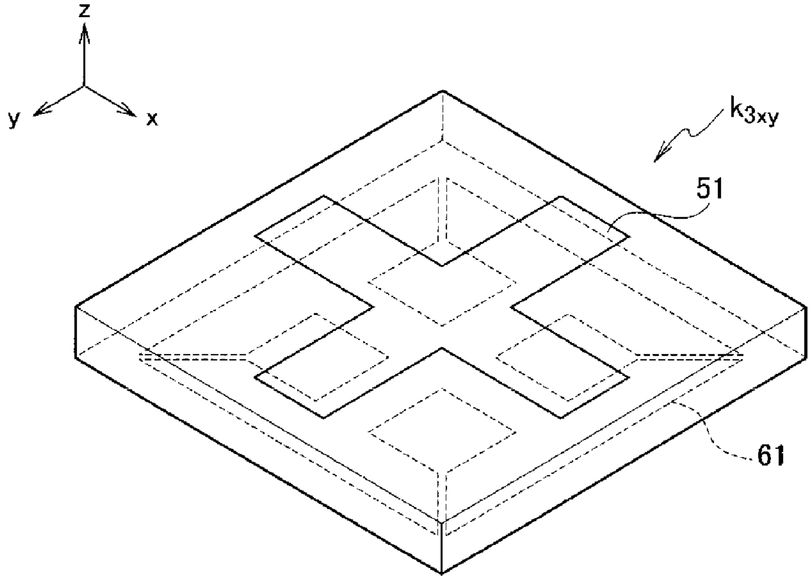
FIG. 10 is a perspective view schematically illustrating a resonator included in a frequency selective surface according to a third embodiment of the present invention.

FIG. 10 is a perspective view schematically illustrating the appearance of a resonator $k_{3xy}$ included in a frequency selective surface 300 (not illustrated) according to a third embodiment of the present invention.

The resonator $k_{3xy}$ includes a first conductive pattern 51 formed on one surface (front surface) of the dielectric substrate 101 and having a cross shape, and a second conductive pattern 61 formed on the other surface (back surface) of the dielectric substrate 101 and having a shape different from the shape of the first conductive pattern. The second conductive pattern 61 has the shape of a cross and the lateral pattern 10 and the longitudinal pattern 20 forming the cross are shaped such that each pattern is extended by a predetermined length in respective directions, each pattern extended by the predetermined length is further extended in both directions orthogonal to each other on the dielectric substrate 101, and leading end parts of the respective further extensions face each other at the predetermined interval d.

The conductive pattern 61 has the same shape as that of the resonator $k_{1xy}$ illustrated in FIG. 3. Thus, a frequency selective surface (not illustrated) formed on the back surface of the dielectric substrate 101 can be expressed as an equivalent circuit in which two LC serial resonance circuits are connected in parallel with each other.

On the other hand, a frequency selective surface (not illustrated) formed on the front surface of the dielectric substrate 101 can be expressed as an equivalent circuit of one LC serial resonance circuit. The conductive pattern 51 formed on the front surface of the dielectric substrate 101 and the conductive pattern 61 formed on the back surface thereof are connected with each other through a capacitor with the dielectric substrate 101 interposed therebetween.

Accordingly, the frequency selective surface 300 has an equivalent circuit in which three LC serial resonance circuits are connected in parallel with one another.

Figure 11:
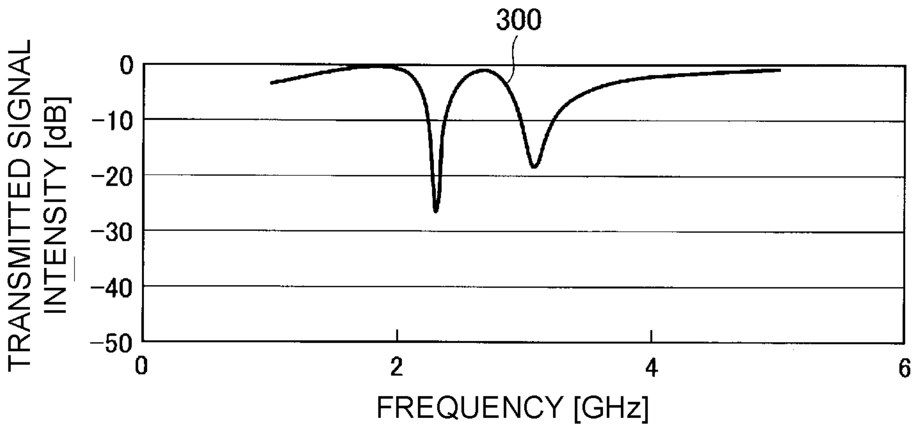
FIG. 11 is a diagram illustrating the transmission characteristic of the frequency selective surface illustrated in FIG. 10.

FIG. 11 is a diagram illustrating the transmission characteristic of the frequency selective surface 300. In FIG. 11, the horizontal axis represents frequency [GHz], and the vertical axis represents transmitted signal intensity [dB]. The frequency selective surface 300 in this example has two band stop characteristics of 2.3 GHz and approximately 3 GHz. In this example, the band stop characteristic of approximately 3 GHz is not expected.

As illustrated in FIG. 11, the band stop characteristic at the peak frequency of 2.3 GHz has a bandwidth of 0.4 GHz, which is a more steep attenuation slope characteristic than those of the above-described embodiments. In this manner, the frequency selective surface 300, which can be expressed as an equivalent circuit in which three LC serial resonance circuits are connected in parallel with one another, can achieve a steep band stop characteristic sandwiched between band-pass characteristics.

As described above, the frequency selective surfaces 100, 200, and 300 according to the present embodiments can have a steep attenuation slope characteristic without decreasing the line width of a conductive pattern nor the pattern interval thereof. In the above description of the embodiments, the shape of each conductive pattern is, for example, a cross shape, a Jerusalem cross shape, and a deformed shape of a Jerusalem cross (FIG. 3), but the present invention is not limited to these examples.

In this manner, needless to say, the present invention includes various embodiments and the like not written in the specification. Thus, the technical scope of the present invention is determined only by appropriate invention specifying matters of the claims based on the above description.

REFERENCE SIGNS LIST

1, 2 LC serial resonance circuit
100, 200, 300, 500 frequency selective surface
10 lateral pattern
20 longitudinal pattern
11*a*, 11*b*, 21*a*, 21*b* leading end part d interval
k1*xy*, k2*xy*, k3*xy*, k5*xy* resonator
30, 40, 101 dielectric substrate
51, 61 conductive pattern

The invention claimed is:

1. A frequency selective surface having a structure in which resonators having identical shapes are periodically arrayed on a dielectric substrate,
wherein each of the resonators has an equivalent circuit in which two or more LC serial resonance circuits are connected in parallel with each other, and
wherein each of the resonators includes a cross-shaped conductive pattern formed on the dielectric substrate and a lateral pattern and a longitudinal pattern forming a cross are shaped such that each pattern is extended by a predetermined length in respective directions, each pattern extended by the predetermined length is further extended in both directions orthogonal to each other on the dielectric substrate, and leading end parts of the respective further extensions face each other at a predetermined interval.

2. The frequency selective surface according to claim 1, wherein
each of the resonators includes
a first conductive pattern formed on a first dielectric substrate,
a second conductive pattern formed on a second dielectric substrate and having a shape different from a shape of the first conductive pattern, and
the first dielectric substrate and the second dielectric substrate are placed over each other.

3. The frequency selective surface according to claim 2, wherein
the first conductive pattern has a cross shape, and
the second conductive pattern includes formation of a cross and a lateral pattern and a longitudinal pattern forming the cross are shaped such that each pattern is extended by a predetermined length in respective directions, each pattern extended by the predetermined length is further extended in both directions orthogonal to each other on the dielectric substrate, and leading end parts of the respective further extensions face each other at a predetermined interval.

4. The frequency selective surface according to claim 1, wherein each of the resonators includes
a first conductive pattern formed on one surface of the dielectric substrate, and a second conductive pattern formed on the other surface of the dielectric substrate and having a shape different from a shape of the first conductive pattern.

* * * * *